US007925680B1

(12) United States Patent
Mackrory et al.

(10) Patent No.: US 7,925,680 B1
(45) Date of Patent: Apr. 12, 2011

(54) SYSTEM AND METHOD FOR PROCESSING DATA MANAGEMENT FILES IN A VIRTUAL STORAGE ENVIRONMENT

(75) Inventors: Mitchell Mackrory, Longmont, CO (US); Michael A. Bucari, Northampton, PA (US); Kenneth Lawrence Carl, Arvada, CO (US); David Mark Cole, Superior, CO (US); David Howard, Guildford (GB)

(73) Assignee: Oracle America, Inc., Redwood City, CA (US)

( * ) Notice: Subject to any disclaimer, the term of this patent is extended or adjusted under 35 U.S.C. 154(b) by 440 days.

(21) Appl. No.: 10/897,303

(22) Filed: Jul. 21, 2004

(51) Int. Cl.
*G06F 7/00* (2006.01)
*G06F 17/30* (2006.01)

(52) U.S. Cl. ............ 707/812; 707/821; 707/831; 711/4; 711/6; 711/100

(58) Field of Classification Search .............. 707/3, 100, 707/102, 204, 10, 205, 812, 821, 831; 711/154, 711/111, 4, 114, 6, 100
See application file for complete search history.

(56) References Cited

U.S. PATENT DOCUMENTS

| | | | | |
|---|---|---|---|---|
| 6,049,848 | A * | 4/2000 | Yates et al. | 711/111 |
| 6,324,497 | B1 * | 11/2001 | Yates et al. | 703/24 |
| 6,336,163 | B1 * | 1/2002 | Brewer et al. | 711/112 |
| 6,839,796 | B2 * | 1/2005 | Dawson et al. | 707/205 |
| 6,851,031 | B2 * | 2/2005 | Trimmer et al. | 711/161 |
| 6,973,534 | B2 * | 12/2005 | Dawson et al. | 707/205 |
| 2002/0035664 | A1 * | 3/2002 | Yates et al. | 711/111 |
| 2003/0177266 | A1 * | 9/2003 | Britton | 709/245 |
| 2004/0044826 | A1 * | 3/2004 | Dawson et al. | 711/4 |
| 2004/0044851 | A1 * | 3/2004 | Dawson et al. | 711/154 |
| 2004/0044863 | A1 * | 3/2004 | Trimmer et al. | 711/161 |
| 2004/0153614 | A1 * | 8/2004 | Bitner et al. | 711/162 |
| 2006/0123189 | A1 * | 6/2006 | Bitner et al. | 711/111 |

OTHER PUBLICATIONS

OpenTech System, Inc. "Virtual Data Recovery" 2000-2003 (pp. 1-6).*
Tuel, W. G.—"An Analysis of Buffer Paging in Virtual Storage Systems"—IBM Journal of Research and Development, vol. 20, Issue: 5, Sep. 1976, (pp. 518-520).*
R. Baird—Virtual Storage Architecture Guide (VSAG)'—Mass Strage Systems, Sep. 11-14, 1995 (pp. 312-326).*
Christensen, "Virtual Tape: IBM and StorageTek Offerings—An Update", www.NASPA.com, Technical Support, May 2001, 4 pages.
MacNeill et al., Class Manifest, Manifest (Apache Ant API), http://lamp.epfl.ch/~linuxsoft/ant/manual/api/org/apache/tools/ant/taskdefs/Manifest.html, 2000-2002, pp. 1-9.
Stansifer, Jar Files, http://www.cs.fit.edu/~ryan/java/language/jar.html, Mar. 12, 2002, pp. 1-4.
Kadleck et al., "IBM TotalStorage Virtual Tape Server, Planning, Implementing, and Monitoring", ibm.com/redbooks, Sep. 2002, pp. Contents—364.

* cited by examiner

*Primary Examiner* — Jean B. Fleurantin
*Assistant Examiner* — Anh Ly
(74) *Attorney, Agent, or Firm* — Brooks Kushman P.C.

(57) ABSTRACT

A system and method for processing a plurality of data storage and retrieval management or manifest files in a virtual data storage system. A plurality of individual management/manifest files, which are each used to track data management information stored on a data storage device, are merged into a single management or manifest file that can then be used to subsequently manage the input or import of data such as logical volumes from one or more physical media. This single management/manifest file could be used, for example, in a media import operation for importing a media cartridge or device into a media library such as a data storage library.

21 Claims, 8 Drawing Sheets

SYSTEM AND METHOD FOR PROCESSING DATA MANAGEMENT FILES IN A VIRTUAL STORAGE ENVIRONMENT

BACKGROUND OF THE INVENTION

1. Field of the Invention

The present invention relates to data processing operations, and in particular relates to data storage backup and restore operations.

2. Background of the Invention

Today's computer systems generate enormous amounts of data. The amount of data being stored on fixed media such as disk, and removable media such as tape or CD/DVD, is exploding as the cost for storing on these media types continues to drop.

Many computer systems use fixed media such as disk for general day-to-day computer operations, and then periodically archive their data onto some type of removable media such as tape or CD/DVD. The removable media can then be physically transported to an off-site location to help protect data in case of some destructive or catastrophic event at the main computer site such as a fire or explosion. The data stored at the offsite location could then be used to restore the data on a replacement or the same computer system.

Data on fixed media such as disk may also be backed-up periodically on-site, where data is copied to removable media and then deleted from the fixed media in order to free-up space on the fixed media device. The data can then be retrieved from the removable media if the data is subsequently needed. An example of this type of archive system would be for storing old email messages for a mail server, to free up additional disk space for the server's use when their disk file(s) approach capacity usage.

Automated library systems are very popular for automating this data backup and restore operation from fixed to removable media, where large arrays of storage cells are used to physically hold a plurality of removable media devices, and a robot or robotic subassembly is used to physically transport the media from a cell to a media drive for reading and writing data from/to the media without human intervention. An example of such a system is an L180 Automated Tape Library System available from Storage Technology Corporation, headquartered in Louisville, Colo.

When one or more removable media are removed from a tape library—such as for moving the media to a secure off-site location—the tape cartridges must be checked out of the automated library system similar to how books are checked out of a regular library. This allows the system software to keep track of the data cartridge(s) and whether or not the cartridge is physically resident in its local tape library. Software utilities commonly known as "Import" and "Export" are used to manage tape cartridge insertion into and removal from an automated library. Import and Export are typically used to move volumes to another location for long term archiving or for backup purposes, for workload balancing by moving data from one system to another, and for data interchange between systems. Import and Export utilities are also used to manage the import and export of data in a virtual tape environment, such as the environment provided by the Virtual Storage Manager™ system which is also available from Storage Technology Corporation (Virtual Storage Manager is a trademark of Storage Technology Corporation).

Many legacy software applications assumed a tape volume to be of a certain fixed storage capacity. Because of increases in tape storage capacity, it is now possible to store many of these legacy tape volumes onto a single physical tape cartridge. Also, in order to avoid this type of mismatch problem in today's computing environment, the concept of a logical or virtual volume has been defined so that the operating system or application program does not have to concern itself with the physical intricacies of the storage media. The logical/virtual volume appears to the operating system or application program as a volume having certain characteristics. However, the actual physical characteristics of the storage media may be, and typically are, much different than the storage characteristics of the logical/virtual volume being accessed. By defining and using logical or virtual volumes by software applications, it is now possible to decouple the intricacies of the physical storage media from the software application. Typically, an intervening tool within the overall system, logically located between the application program and the media drive, is used to perform logical to physical mapping so that the physical media and its associated characteristics are transparent to the software application. When a logical volume is defined to be smaller than the physical volume, it is possible to write a plurality of logical volumes onto the physical volume. In such a situation, a single physical tape cartridge is sometimes referred to as a multi-volume cartridge (MVC) because it contains a plurality of logical/virtual tape volumes. An individual logical/virtual volume within such multi-volume cartridge is sometimes referred to as a virtual tape volume (VTV).

The "Export" utility previously mentioned is an operation which copies one or more logical volumes to a physical cartridge or volume. The process of exporting identifies the relationships between the multiple VTVs and MVCs. This process can include the creation of additional copies of VTVs specifically for the export process followed by the description of the relationships of an existing set of VTVs and MVC(s), or it can just be the creation of a description of the relationships of a preexisting set of VTVs and MVC(s). After completing the export process, the cartridge can then be ejected from the library system for cartridge relocation to another system, for reasons previously described.

In similar fashion, the "Import" utility is an operation that can be used to copy one or more previously exported logical volumes from an exported physical volume into the local system environment. In some situations, the import process is not used to copy data into the system, but rather is used to populate the target system with the relationships between the VTVs and the MVCs. As previously described, a manifest file is created during the Export operation, and is a list of all the virtual volumes on one or more exported MVC cartridges, and is subsequently used by the Import utility when copying virtual volumes from the previously exported MVC volume(s) into the local system environment. The problem with today's systems is that a separate manifest file can be created each time an Export operation is run and it is on these occasions, when multiple manifest files are created, that a problem occurs. When an Import operation is subsequently run, each of these plurality of manifest files must be processed. This problem stems from the fact that this type of export process creates a manifest file of a unique set of VTVs and MVCs and it bears no relationship to any predefined group of VTVs and/or MVCs. The particular challenge is that when one of these types of manifest files is processed, the relationships can be quite complex. For example, if a storage class is defined that causes VTVs of this group to be pre-grouped as a collection on a unique set of MVCs, it is possible to export this storage class as a group and manage the group in a cumulative manner. In this situation, each manifest file is cumulative when it is created. However, if a set of VTVs for which there is no predefined grouping (storage class) are exported, the resultant manifest file is unique. It is independent and unrelated to earlier or later manifest files that pertain to these VTVs. When these manifest files are subsequently imported, the user/system operator has to determine the sequence of importing since two or more manifest files may contain different versions of the same dataset (VTV). The user/system operator also potentially needs to process a great number of these manifest files since there is not an easy way to tell which manifest files hold no valid data and therefore do not require processing.

Consider, for example, that a user wanted to create four export processes each day, and after two years decided to import this data into a new system as a result of a disaster. There would be 2,920 manifest files (365×4×2) to process. This is a massive operational issue. This problem is exacerbated in a virtual environment. The relationship between physical volumes and physical cartridges is simple. The physical volume(s) either exist on the physical cartridge(s) or they do not and typically a Tape Management System (TMS) will store all the information pertaining to which volume is current and which physical volume it resides on. When virtual volumes such as VTVs are loaded onto physical volumes such as MVCs, only the Virtual Storage Manager system where they were created has full knowledge of the complex relationships between the virtual and physical components. In each creation of a manifest file (of which there may be many), this full knowledge of the complex relationship is unique and complete. However, as soon as there is more than one manifest file that needs to be processed, the information contained in these multiple manifest files is insufficient to resolve all the relationships. It would therefore be desirable to provide a system and method to better manage a plurality of manifest files in a virtual data storage environment.

SUMMARY OF THE INVENTION

The present invention is a system and method for processing a plurality of data storage and retrieval management or manifest files in a virtual data storage system. A plurality of individual management/manifest files, which are each used to track data management information stored on a data storage device, are merged into a single management or manifest file that can then be used to subsequently manage the input or import of data such as logical volumes from one or more physical media. This single management/manifest file could be used, for example, in a media import operation for importing a media cartridge or device into a media library such as a data storage library.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
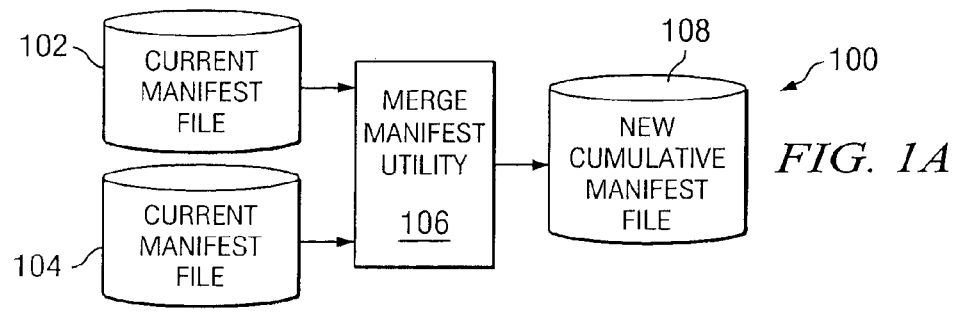
FIGS. 1a and 1b depict the overall system architecture of a merge manifest file utility.
Figure 1B:
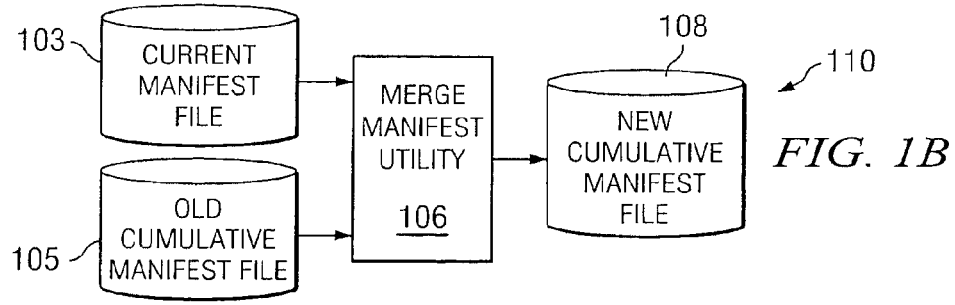

A block diagram of a high level system overview is shown at 100 in FIGS. 1a and 110 in FIG. 1b. A plurality of input files, such as files 102/103 and 104/105, are input into a merge manifest utility 106 (more than two input files are possible, but only two are shown for ease of explanation and clarity). The very first time the system operates, as shown in FIG. 1a, the input files 102 and 104 are regular manifest files that are the resultant output from two different export operations. The merge manifest utility 106, which will be further described below, reads these input files and creates a cumulative output file 108. During subsequent runs of the file merge utility 106, as shown in FIG. 1b, one of the files (103 or 105) would be a similar manifest file that is the output of yet another export function operation, but the other input file (103 or 105) is a cumulative manifest file that has previously been output from this same merge manifest utility. In other words, subsequent runs of the merge manifest utility combine new manifest information from a new manifest file with an existing cumulative file. When the cumulative file is used as input, it is referred to herein as the old cumulative file, and when the cumulative file is referenced as the output of the merge utility, it is referred to herein as the new cumulative file.

Figure 2A:
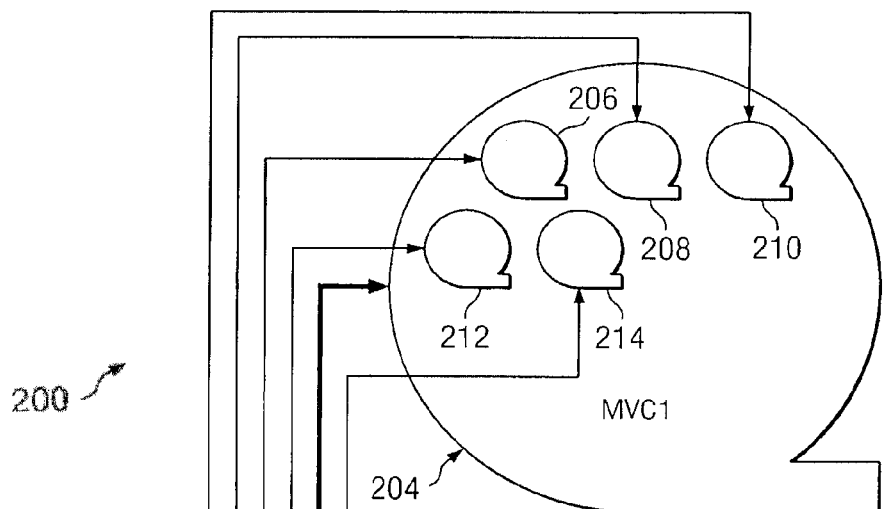
FIG. 2a depicts creation of a manifest file using two original manifest files as input files to a file merge process.
Figure 2A:
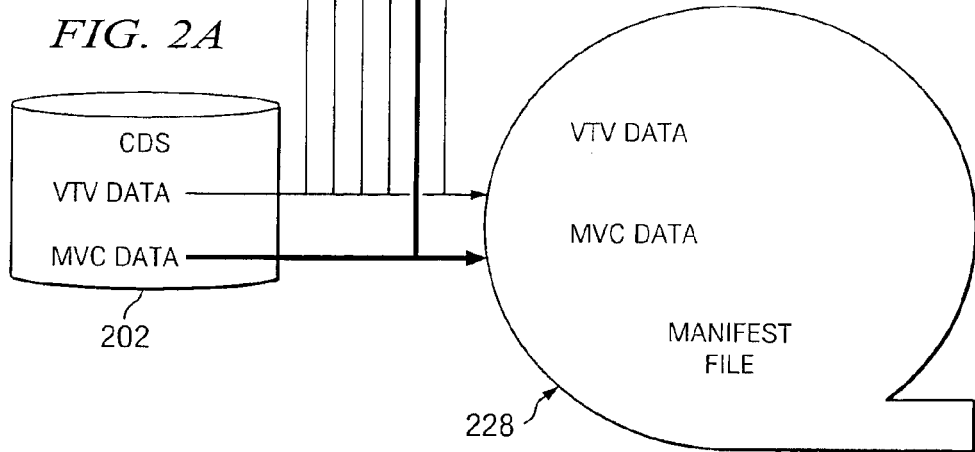
Figure 2B:
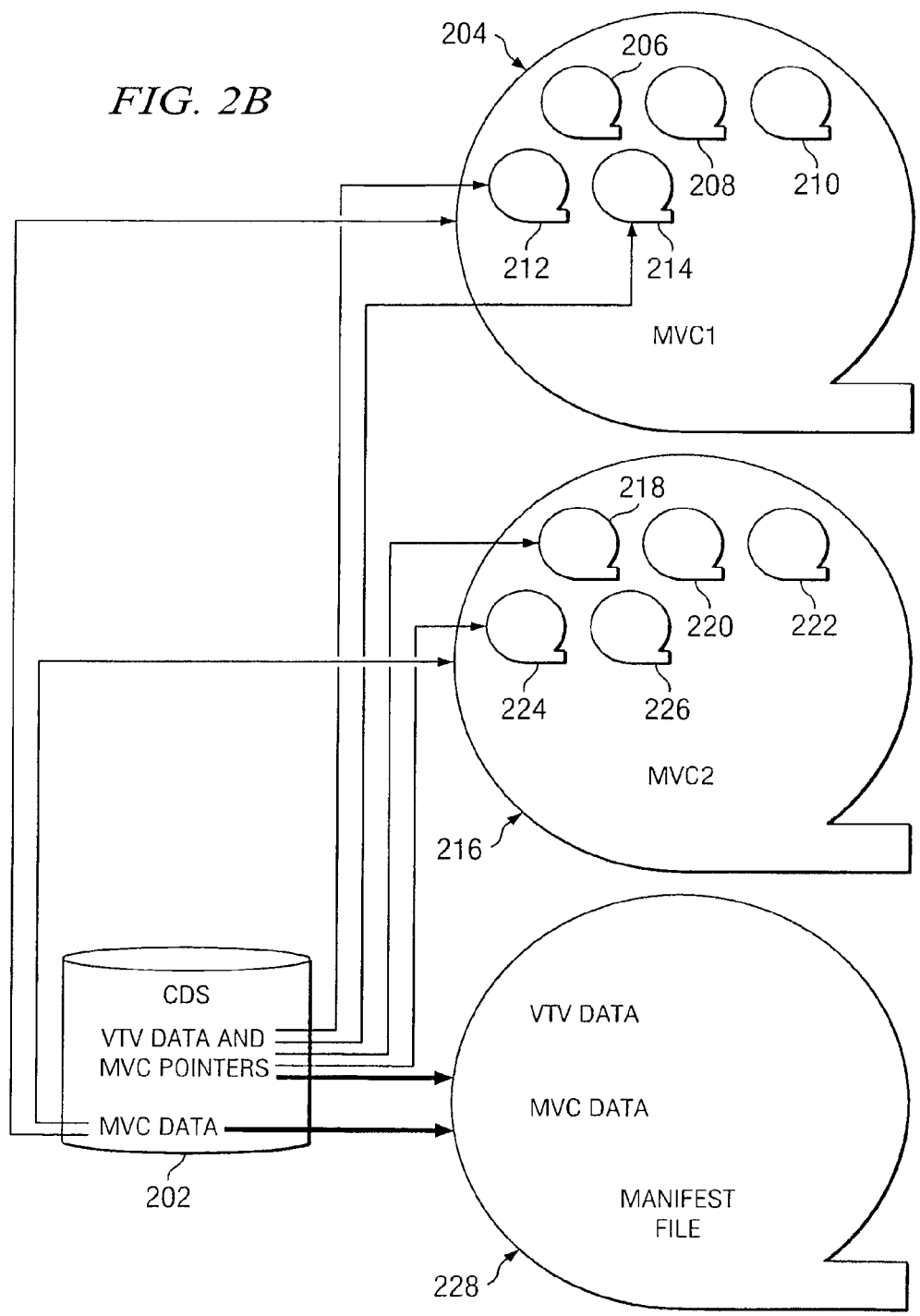
FIG. 2b depicts creation of a manifest file using an old cumulative manifest file and an original manifest file as input files to a file merge process.

A manifest file is created as a result of an Export operation being run, as previously described. Exporting in a virtual environment is shown at 200 in FIG. 2a. Control data set (CDS) 202 contains details of the virtual tape volumes (VTVs) and the multi-volume cartridges (MVCs) and the relationship between them. It specifically refers to the data set used to identify and control the configuration and components of an Automated Tape Library system and a Virtual Storage Manager system. This identification and control includes information about each VTV and each MVC. In the example shown in FIG. 2a, multi-volume cartridge 1 (MVC1) 204 contains five virtual tape volumes 206, 208, 210, 212 and 214. When an export operation is run, the relevant data associating the VTVs with the MVC(s) is copied from the CDS 202 to the manifest file 228. In the example shown in FIG. 2a, MVC1 (including its associated VTVs) is being exported. In the example shown in FIG. 2b, multi-volume cartridge 1 (MVC1) 204 contains five virtual tape volumes 206, 208, 210, 212 and 214. Similarly, multi-volume cartridge 2 (MVC2) 216 contains five virtual tape volumes 218, 220, 222, 224 and 226. While only representative arrows are shown in FIG. 2b, relevant data for associating all the VTVs with their respective MVC is included on CDS 202. When an export operation is run, the relevant data associating the VTVs with the MVCs is copied from the CDS 202 to the manifest file 228. In the example shown in FIG. 2b, MVC1 (including its associated VTVs) and MVC2 (including its associated VTVs) are being exported.

Figure 3:
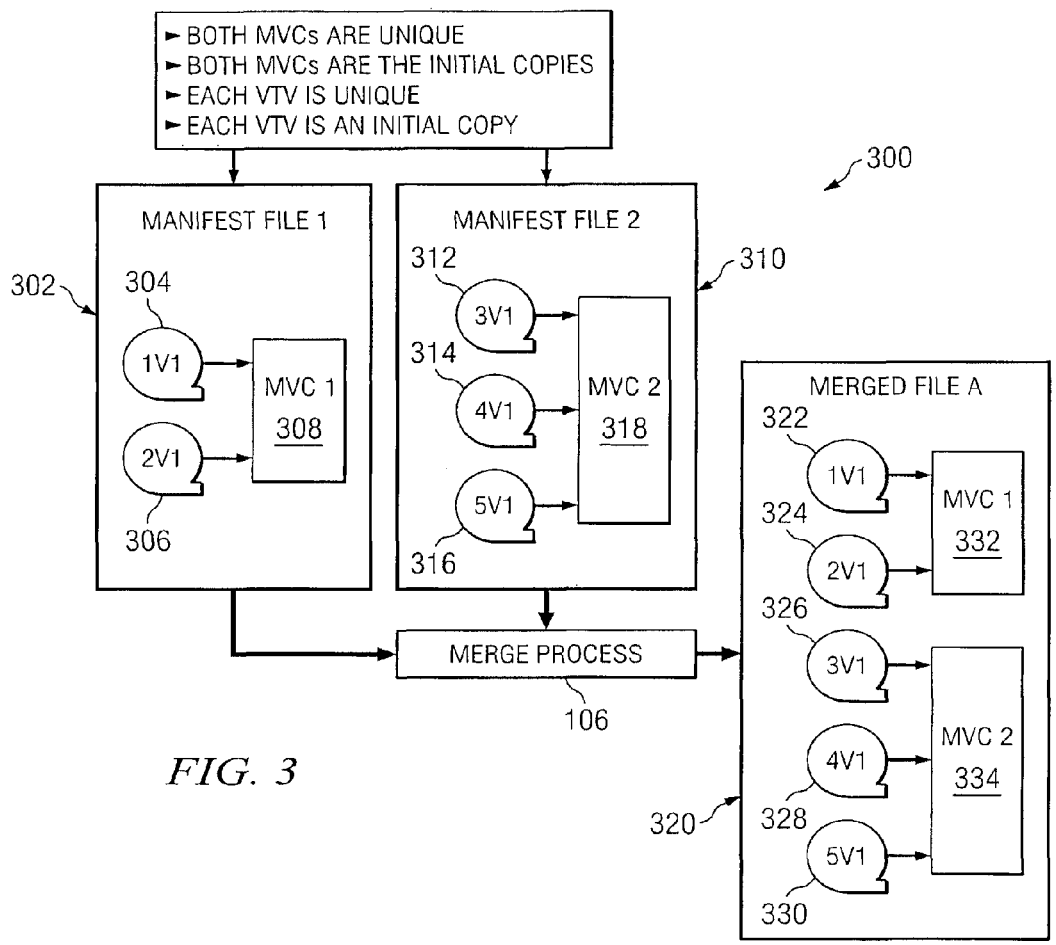
FIG. 3 depicts an example of merging two manifest files using the merge manifest utility, where the multi-volume cartridges and virtual tape volumes are all unique.

An example of merging two manifest files using the merge manifest utility 106 of FIGS. 1a and 1b will now be shown at 300 in FIG. 3. Manifest file 1, shown at 302, was created as the result of an export operation that exported multi-volume cartridge MVC 1 (shown at 308). MVC 1 contains two logical tape volumes 1V1 and 2V1 (shown at 304 and 306, respectively). 1V1 is terminology meaning this is version 1 of logical volume 1. 2V1 is terminology meaning this is version 1 of logical volume 2. Generally, the first digit indicates the logical volume number, and the last digit indicates the version number. Manifest File 2, shown at 310, was created as the result of an export operation that exported multi-volume cartridge MVC 2 (shown at 318). MVC 2 contains three logical tape volumes 3V1, 4V1 and 5V1 (shown at 312, 314 and 316, respectively). These two manifest files 302 and 310 are merged by merge manifest utility 106 to create Merged File A (shown at 320). Merged File A is the new cumulative output file corresponding to element 108 in FIGS. 1a and 1b. Merged File A is shown including both MVC 1 (shown at 332) and MVC 2 (shown at 334). In this rather straightforward example, all information from each of the input manifest files was included in the merged output file since both MVCs were unique, both MVCs are the initial copies, each VTV is unique, and each VTV is an initial copy. However, this will not always be the case as will now be shown in the next example.

Figure 4:
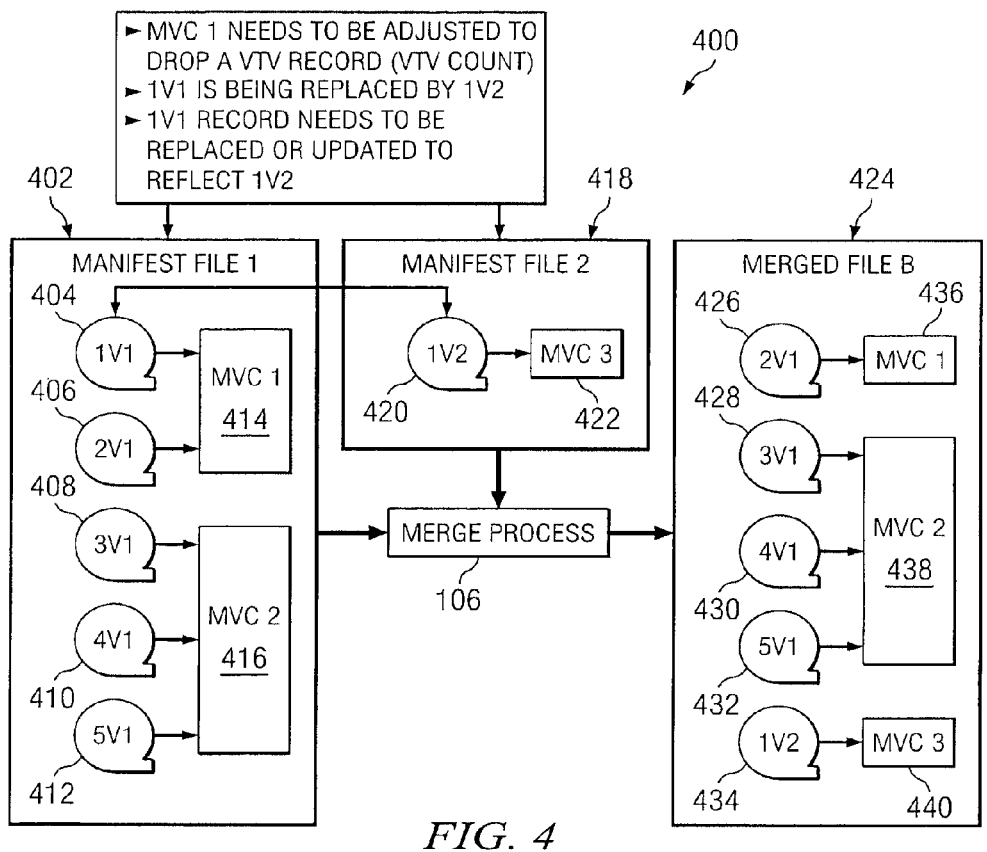
FIG. 4 depicts an example of merging two manifest files using the merge manifest utility, where different versions of a virtual tape volume exist.

Turning now to FIG. 4, there is shown another merge example at 400. Manifest File 1, shown at 402, was created as the result of an export operation that exported multi-volume cartridge MVC 1 and MVC 2 (shown at 414 and 416, respectively) and could be, for example, the resulting Merged File A shown at 320 in FIG. 3. MVC 1 contains two logical tape volumes 1V1 and 2V1 (shown at 404 and 406, respectively). MVC 2 contains three logical tape volumes 3V1, 4V1 and 5V1 (shown at 408, 410 and 412, respectively). As can be seen by this example, the Export utility can export a plurality of multi-volume cartridges, with the details of each MVC included in the resulting export manifest file such as Manifest File 1. Manifest File 2, shown at 418, was created as the result of an export operation that exported multi-volume cartridge MVC 3 (shown at 422). MVC 3 contains one logical tape volume 1V2 (shown at 420). As previously described, logical tape volume 1V2 means logical tape volume 1, version 2.

These two manifest files 402 and 418 are merged by merge manifest utility 106 to create Merged File B (shown at 424). Merged File B is the new cumulative output file corresponding to element 108 in FIGS. 1a and 1b. Merged File B is shown including MVC 1 (shown at 436), MVC 2 (shown at 438), and MVC 3 (shown at 440). In this example, there is not a straight one-to-one mapping of all logical volumes from each of the separate manifest files. This is because there are newer versions of certain of the logical volumes as a result of the cumulative merging of manifest files that refer to different versions of at least some of the logical volumes. For example, logical volume 1 has both a version 1 (as part of MVC 1 in Manifest File 1) and a version 2 (as part of MVC 3 in Manifest File 2). Version 1 of logical volume 1 (volume 1V1) is replaced with version 2 of logical volume 1 (volume 1V2) since it is more current. Thus, the record relating to 1V1 is updated or replaced to reflect the existence of 1V2 such that only the new version is carried forward into the latest cumulative manifest file. In addition, MVC 1 needs to be adjusted to disassociate itself from this down-level VTV, by modifying a VTV count field that contains a current count of the total number of VTVs that point to the MVC (in this example, by decrementing the VTV count field by one). As can be seen, the resultant Merged File B 424 has information regarding MVC 1 (shown at 436), MVC 2 (shown at 438) and MVC 3 (shown at 440). MVC 1 has a single logical volume 2V1 associated with it, MVC 2 has three logical volumes 3V1, 4V1 and 5V1 associated with it, and MVC 3 has a single logical volume 1V2 associated with it.

Figure 5:
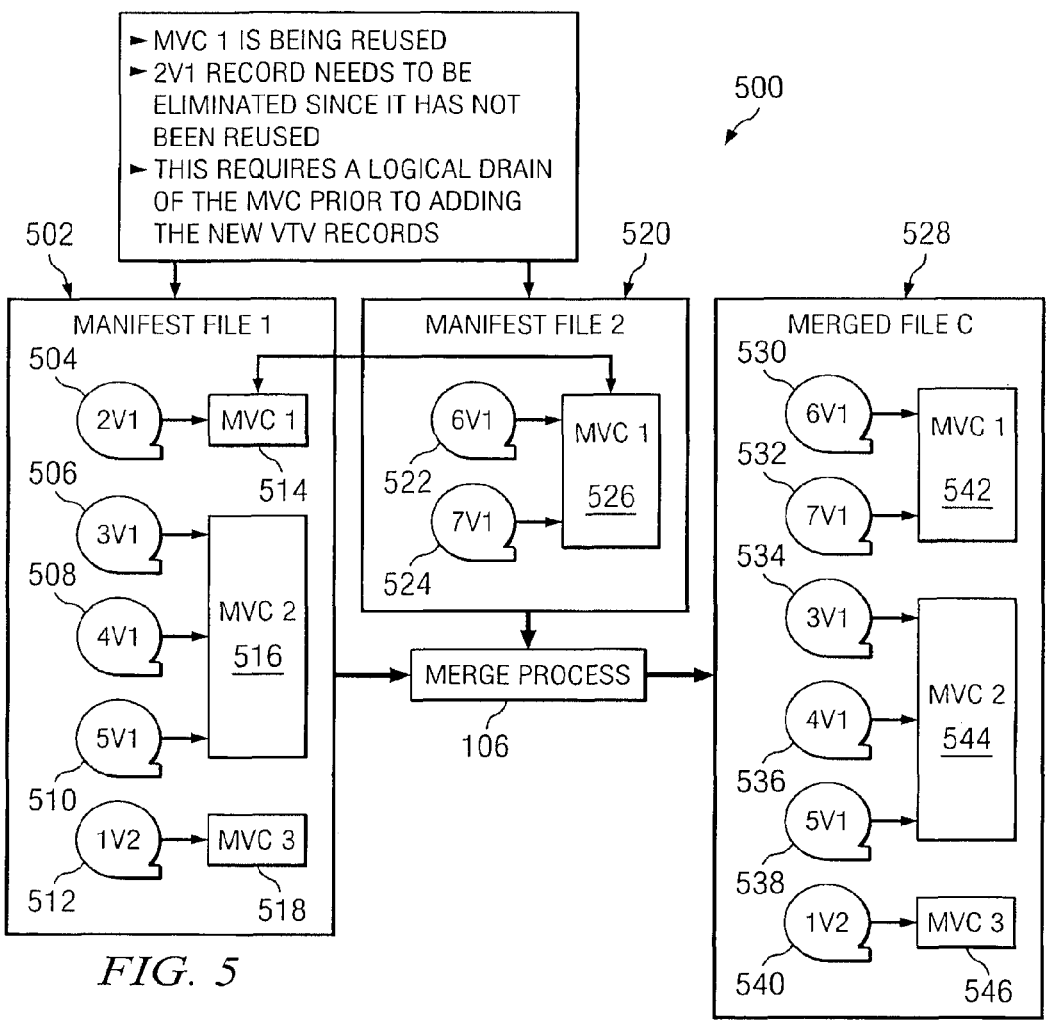
FIG. 5 depicts an example of merging two manifest files using the merge manifest utility, where a multi-volume cartridge has been re-used.

Turning now to FIG. 5, another example of the merge manifest utility is shown at 500. Manifest file 1, shown at 502, was created as the result of an export operation that exported multi-volume cartridge MVC 1, MVC 2 and MVC 3 (shown at 514, 516 and 518, respectively) and could be, for example, the resulting Merged File B shown at 424 in FIG. 4. MVC 1 contains one logical tape volume 2V1 (shown at 504). MVC 2 contains three logical tape volumes 3V1, 4V1 and 5V1 (shown at 506, 508 and 510, respectively). MVC 3 contains one logical tape volume 1V2 (shown at 512). This is another example where the Export utility has exported a plurality of multi-volume cartridges, with the details of each MVC included in the resulting export manifest file such as Manifest File 1. Manifest File 2, shown at 520, was created as the result of an export operation that exported one multi-volume cartridge MVC 1 (shown at 526). In this case, MVC 1 has subsequently been reused after having been exported as shown in Manifest File 1. MVC 1 (shown at 526) contains two logical tape volumes 6V1 and 7V1 (shown at 522 and 524, respectively).

These two manifest files 502 and 520 are merged by merge manifest utility 106 to create Merged File C (shown at 528). Merged File C is the new cumulative output file corresponding to element 108 in FIGS. 1a and 1b. Merged File C is shown including MVC 1 (shown at 542), MVC 2 (shown at 544), and MVC 3 (shown at 546). In this example, MVC 1 has been reused after it was previously exported (the previous export creating Manifest File 1). Accordingly, the merge manifest utility does not copy the 2V1 record that is associated with MVC 1 in Manifest File 1, but instead uses the MVC 1 record and the associated VTV records for VTVs 522 and 524 that are in Manifest File 2. As can be seen, the resultant Merged File C 528 has information regarding MVC 1 (shown at 542), MVC 2 (shown at 544) and MVC 3 (shown at 546). MVC 1 has two logical volumes 6V1 and 7V1 (shown at 530 and 532, respectively) associated with it, MVC 2 has three logical volumes 3V1, 4V1 and 5V1 (shown at 534, 536 and 538, respectively) associated with it, and MVC 3 has a single logical volume 1V2 (shown at 540) associated with it.

Figure 6:
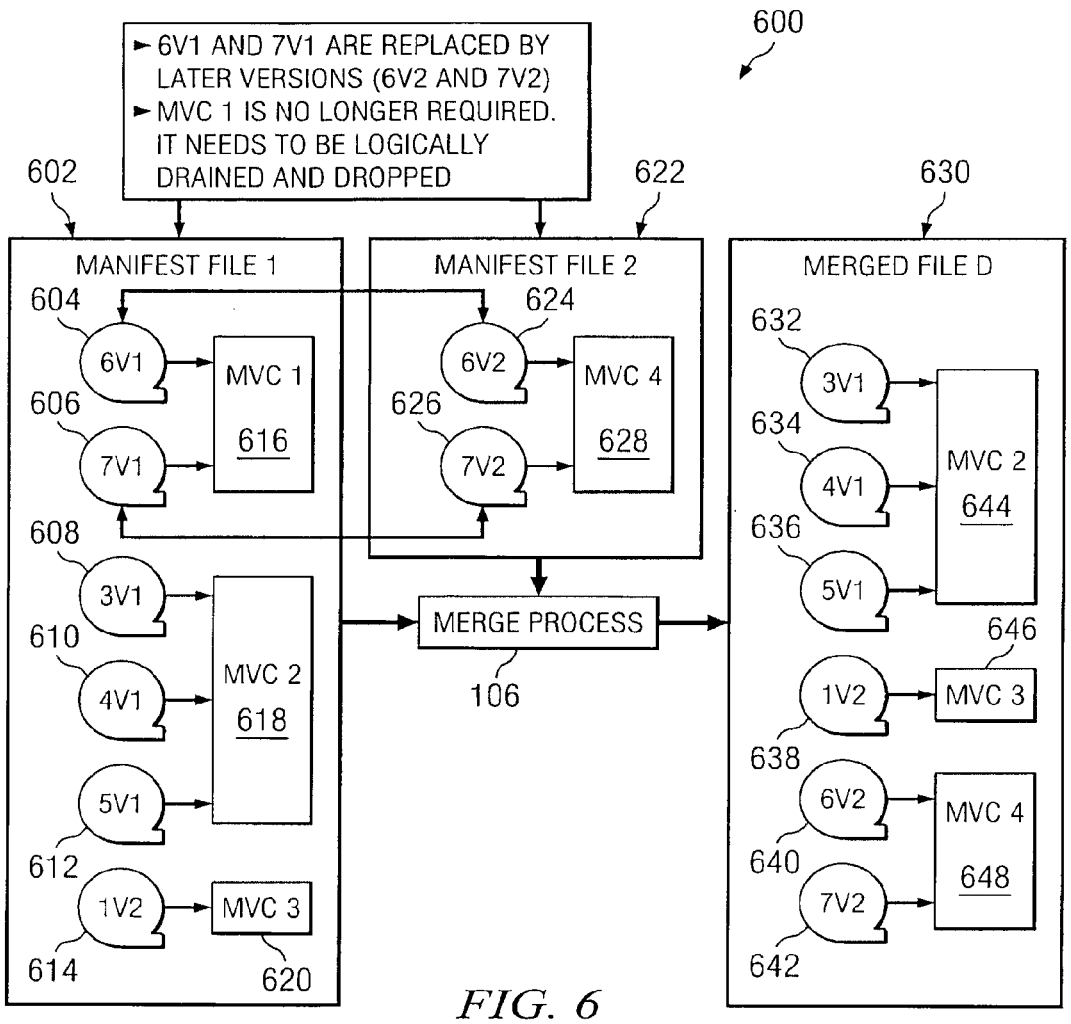
FIG. 6 depicts an example of merging two manifest files using the merge manifest utility, where a multi-volume cartridge is obsolete and different versions of virtual tape volumes exist.

Turning now to FIG. 6, another example of the merge manifest utility is shown at 600. Manifest file 1, shown at 602, was created as the result of an export operation that exported multi-volume cartridge MVC 1, MVC 2 and MVC 3 (shown at 616, 618 and 620, respectively) and could be, for example, the resulting Merged File C shown at 528 in FIG. 5. MVC 1 contains two logical tape volumes 6V1 and 7V1 (shown at 604 and 606, respectively). MVC 2 contains three logical tape volumes 3V1, 4V1 and 5V1 (shown at 608, 610 and 612, respectively). MVC 3 contains one logical tape volume 1V2 (shown at 614). This is another example where the Export utility has exported a plurality of multi-volume cartridges, with the details of each MVC included in the resulting export manifest file such as Manifest File 1. Manifest File 2, shown at 622, was created as the result of an export operation that exported one multi-volume cartridge MVC 4 (shown at 628). In this case, newer versions (version 2) of logical volume 6 and logical volume 7 (shown at 624 and 626, respectively) were used when exporting MVC 4 (as shown by Manifest File 2 at 622).

These two manifest files 602 and 622 are merged by merge manifest utility 106 to create Merged File D (shown at 630). Merged File D is the new cumulative output file corresponding to element 108 in FIGS. 1a and 1b. Merged File D is shown including MVC 2 (shown at 644), MVC 3 (shown at 646), and MVC 4 (shown at 648). In this example, MVC 1 is not included in the Merged File D as the only logical volumes associated with it have been updated to newer versions that are now are part of MVC 4. Accordingly, the merge manifest utility does not copy the MVC 1 information. Thus, the resultant Merged File D 630 has information regarding MVC 2 (shown at 644), MVC 3 (shown at 646) and MVC 4 (shown at 648). MVC 2 has three logical volumes 3V1, 4V1 and 5V1 (shown at 632, 634 and 636, respectively) associated with it, MVC 3 has one logical volume 1V2 (shown at 638) associated with it, and MVC 4 has two logical volumes 6V2 and 7V2 (shown at 640 and 642, respectively) associated with it.

The example shown in FIG. 3 showed the merging of two original manifest files each of which were created as a result of an Export operation, as previously discussed in association with FIG. 1a. The examples shown in FIGS. 4-6 show that the same logical flow and rules apply when the two input files are as shown in FIG. 1b—i.e. one input file is a current manifest file from an Export operation, and the other input file is an old cumulative file from a previous merge of manifest files.

Figure 7:
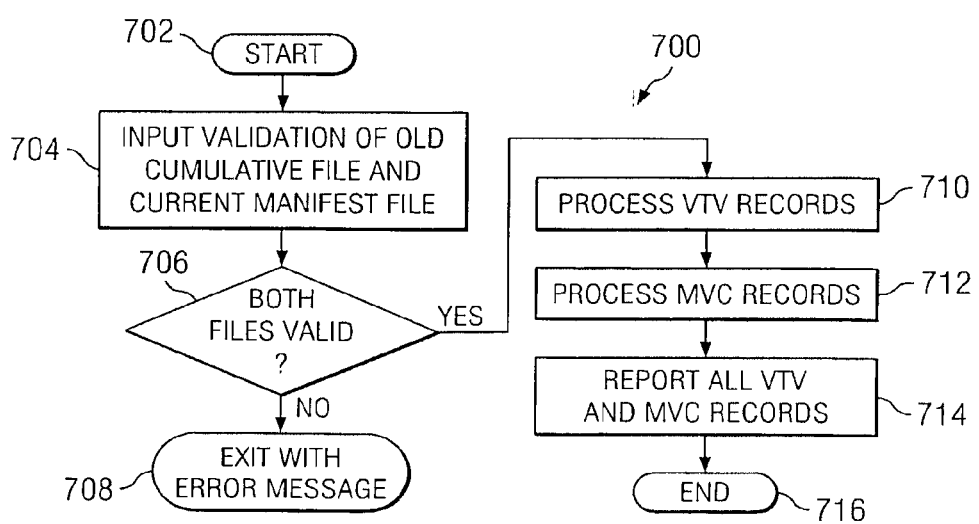
FIG. 7 depicts a flow chart of the overall process flow of the merge manifest utility.

It can thus be seen that the merging of two manifest files used in a virtual environment is not simply a matter of combining the contents of each file into a single file. FIG. 7 shows a flow chart of the overall logical flow for combining two manifest files used in a virtual data storage environment. While these flow charts assume the configuration of FIG. 1b where one of the input files is an old cumulative file, the same logical flow applies for the configuration of FIG. 1a where both the input files are original manifest files from respective Export operations.

Turning now to FIG. 7, the overall flow is shown at 700. The merge manifest process begins at 702 and continues to 704 where an input validation of each of the input files is performed—in this case an old cumulative file and a current manifest file. As previously mentioned, the merge manifest process is not limited to only two input files, but instead supports any number of input files. Two files were chosen for this example for clarity in avoiding unnecessary details. Continuing with FIG. 7, a check is made at 706 whether both input files are valid. If not, an error message is generated and the process ends at 708. If both input files are valid, the process continues at 710 where all the VTV records from each of the two input files are processed. The processing of VTV records will be described in more detail below. Next, all the MVC records for each of the two input files are processed at 712. This processing will be described in more detail below. Then, a report is generated that describes the various VTV and MVC information that was encountered during steps 710 and 712. After generating the report, the merge manifest process ends at 716.

Figure 8:
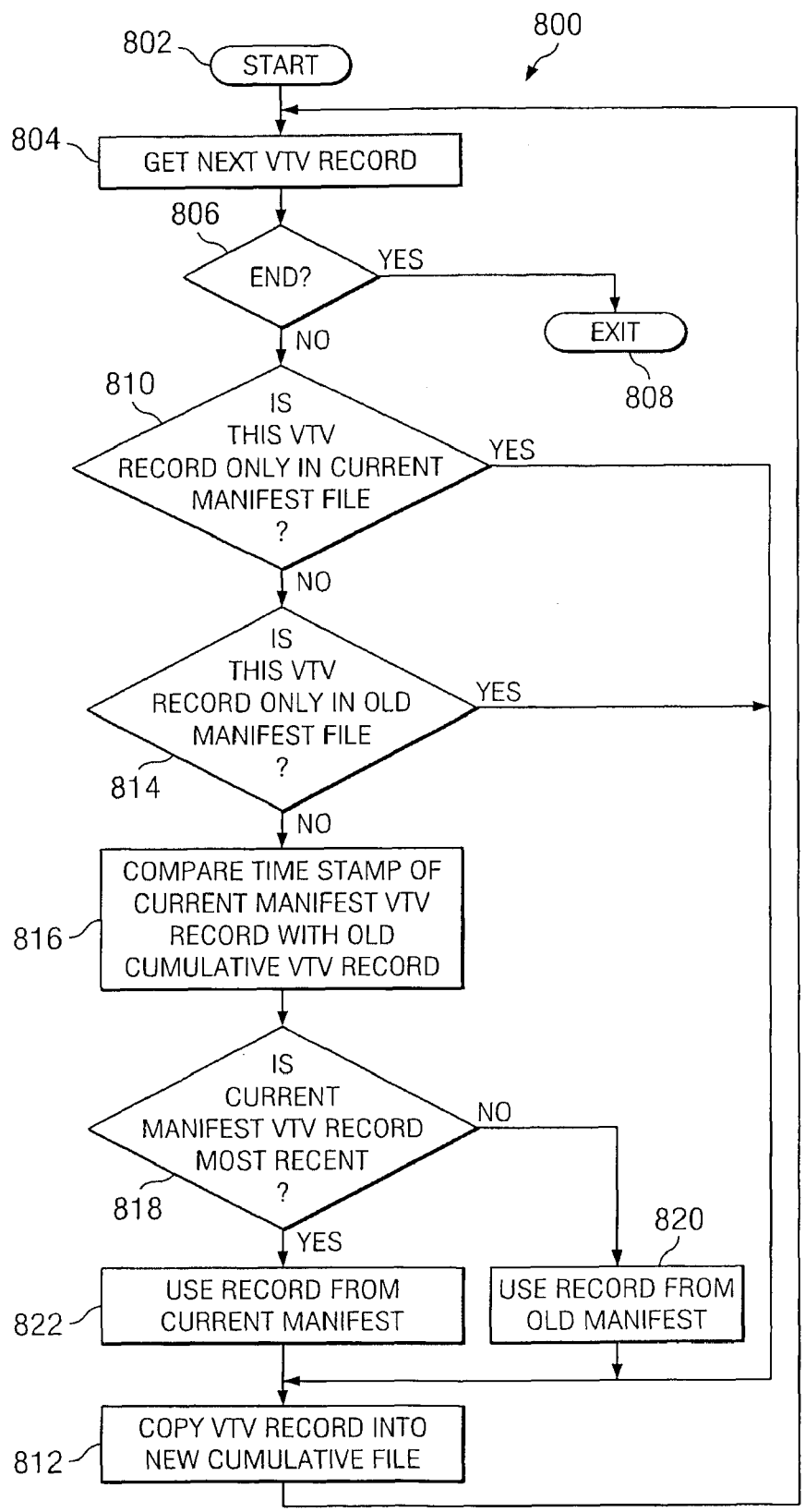
FIG. 8 depicts a flow chart of the logical flow for processing virtual tape volume (VTV) records.

Turning now to FIG. 8, a flow chart of the logical flow for processing VTV records is shown at 800, such processing of VTV records being a part of the overall merge manifest process shown in FIG. 7, and in particular to the processing of VTV records shown by block 710 in FIG. 7. Returning to FIG. 8, the process starts at 802 and continues to step 804, where the next VTV record is retrieved at 804 (VTV records from both input files are sequentially retrieved in this step). A determination is then made if no more VTV records remain at 806. If yes, all VTV records have been processed and process 800 ends at 808. If no, meaning the VTV record retrieval was successful, a determination is made whether this VTV record only exists in the current manifest file (i.e. it doesn't exist in the old cumulative manifest file) at 810. If so, this VTV record is copied into the new cumulative file at 812 and processing continues with the next VTV record at 804. If not, a determination is made whether this VTV record only exists in the old cumulative file at 814. If so, this VTV record is copied into the new cumulative file at 812 and processing continues with the next VTV record at 804. If not, meaning a VTV record for the tape volume exists in both the current manifest file and the old cumulative manifest file, the time stamp for each of these VTV records is compared at 816. If the VTV record in the current manifest file is not the most recent, as determined at step 818, the VTV record from the old, cumulative manifest file is used at 820, and copied into the new cumulative file at 812. If the VTV record in the current manifest file is the most recent, as determined at step 818, the VTV record from the current manifest file is used at 822, and copied to the new cumulative file at 812. In addition at 822, as the VTV reference in the old cumulative manifest file is no longer current, it is logically drained or removed. In one particular embodiment, the VTV record itself is removed from the old cumulative manifest file, and the VTV counter in the applicable MVC record is adjusted accordingly, such as, for example, by decrementing the VTV counter. After the copy at 812 using either the VTV record from the old, cumulative manifest file (at 820) or the current manifest file (at 822), processing continues with the next VTV record at 804.

Figure 9:
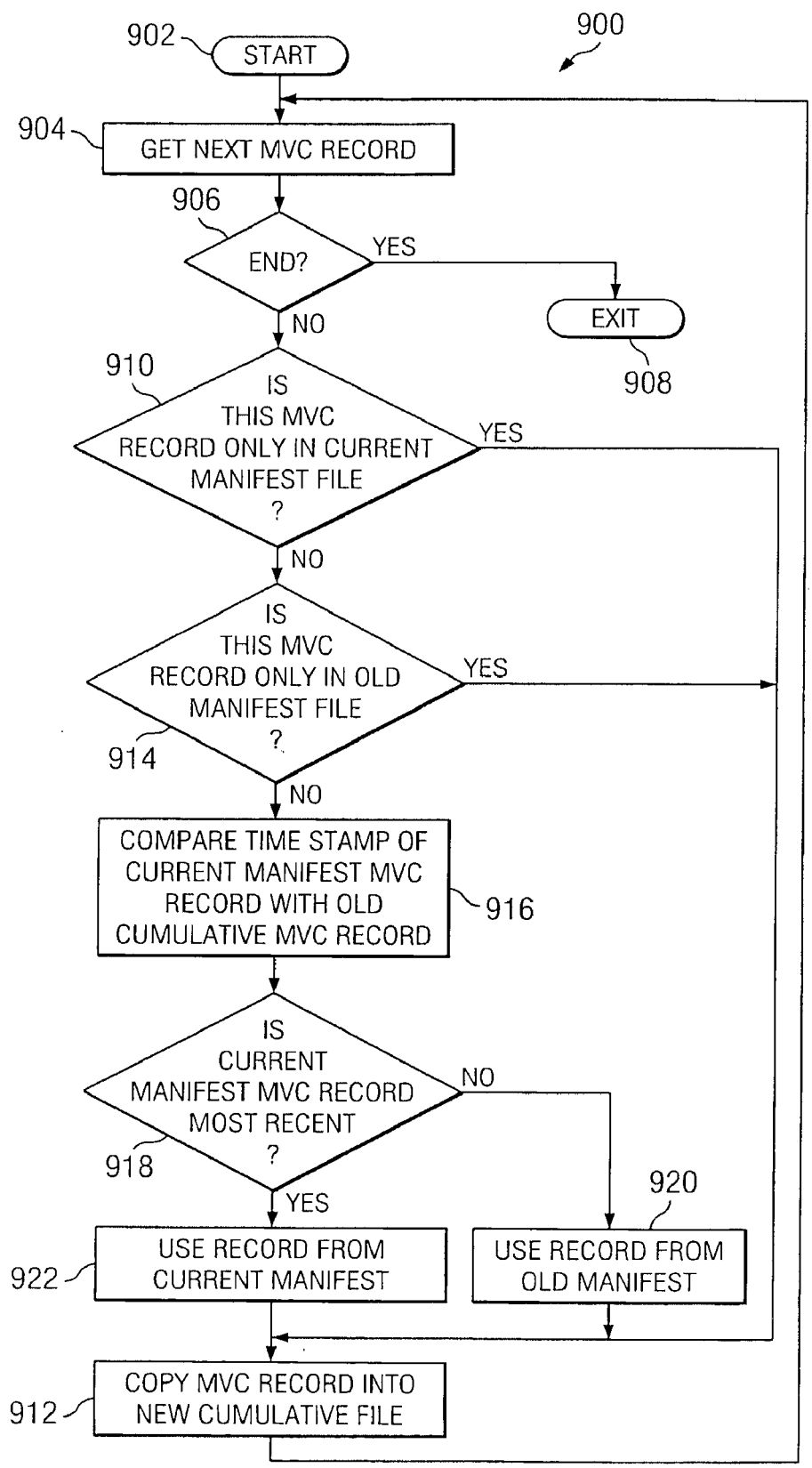
FIG. 9 depicts a flow chart of the logical flow for processing multi-volume cartridge (MVC) records.

Turning now to FIG. 9, a flow chart of the logical flow for processing MVC records is shown at 900. The process starts at 902 and continues to step 904, where the next MVC record is retrieved at 904 (MVC records from both input files are sequentially retrieved in this step). A determination is then made if no more MVC records remain at 906. If yes, all MVC records have been processed and process 900 ends at 908. If no, meaning the MVC record retrieval was successful, a determination is made whether this MVC record only exists in the current manifest file (i.e. it doesn't exist in the old cumulative manifest file) at 910. If so, this MVC record is copied into the new cumulative file at 912 and processing continues with the next MVC record at 904. If not, a determination is made whether this MVC record only exists in the old cumulative file at 914. If so, this MVC record is copied into the new cumulative file at 912 and processing continues with the next MVC record at 904. If not, meaning an MVC record for the multi-volume cartridge exists in both the current manifest file and the old cumulative file, the time stamp for each of these MVC records is compared at 916. If the MVC record in the current manifest file is not the most recent, as determined at step 918, the MVC record from the old, cumulative manifest file is used at 920, and copied into the new cumulative file at 912. If the MVC record in the current manifest file is the most recent, as determined at step 918, then the MVC record in the current manifest file is the current one, and the MVC record from the current manifest file is used at 922, and copied to the new cumulative file at 912. After the copy at 912 using either the MVC record from the old, cumulative manifest file (at 920) or the current manifest file (at 922), processing continues with the next VTV record at 904.

In certain particular embodiments, if it is determined that the currently analyzed MVC record only exists in the old cumulative file, such as determined at step 914, an adjustment may be made to properly reflect the current VTV count and number of bytes used. This situation is analogous to the example described with respect to FIG. 4. In that example, since MVC 1 (shown as 414) was associated with down level virtual volume 1V1 (shown at 404), the MVC 1 record was adjusted, prior to being copied to the new cumulative file (Merged File B shown as 424 in FIG. 4), to eliminate or drop the VTV record for the 1V1 virtual volume, including reducing the VTV count by one. In addition, in this particular embodiment, a determination is then made to determine if the VTV count for this MVC record is zero, meaning there are no more VTVs associated with this MVC record. If the VTV count is zero, there is no need to copy the MVC record to the new cumulative file since there are no more VTVs associated with the MVC record, so processing continues at 904 (bypassing block 912). If the VTV count is not zero, meaning there are still one or more VTVs associated with the MVC record, then this MVC record is copied into the new cumulative file at 912 and processing then continues at 904.

When all records have been processed, the resulting new cumulative manifest file, containing both VTV and MVC information, can then used as the requisite manifest input file for a subsequent import function or operation, where physical media is imported into a media library such as a tape data storage library.

Thus, the merge manifest utility provides for improvements in data storage management in a virtual storage environment by consolidating a plurality of storage management or manifest files into a single file for use by data storage utilities.

It is important to note that while the present invention has been described in the context of a fully functioning data processing system, those of ordinary skill in the art will appreciate that the processes of the present invention are capable of being distributed in the form of a computer program product on a computer readable storage medium of instructions and a variety of forms. Examples of computer readable storage media include recordable-type media such as a floppy disc, a hard disk drive, a RAM, CD-ROMs, DVDs, magnetic tape and reel cartridges.

The description of the present invention has been presented for purposes of illustration and description, and is not intended to be exhaustive or limited to the invention in the form disclosed. Many modifications and variations will be apparent to those of ordinary skill in the art. For example, while the preferred embodiment is directed to automated tape libraries, the concepts described herein are equally applicable to other types of media in a library environment, such as compact discs (CDs) or digital video data (DVDs) associated with a disc carrousel or other type of automated media handling apparatus. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for merging a plurality of manifest files that are the resultant output from different export operations, each having at least one multi-volume media indicia and associated virtual volume indicia, the method comprising the steps of:

retrieving each of the associated virtual volume indicia from the plurality of manifest files and selectively copying certain of the retrieved virtual volume indicia, determined by comparing a virtual volume indicia for a given virtual volume retrieved from a first of the plurality of manifest files with a corresponding virtual volume indicia for the given virtual volume retrieved from a second of the plurality of manifest files to determine which is most current, to an output file; and retrieving each of the associated multi-volume media indicia from the plurality of manifest files and selectively copying certain of the retrieved multi-volume media indicia, determined by comparing a multi-volume media indicia for a given multi-volume cartridge retrieved from a first of the plurality of manifest files with a corresponding multi-volume media indicia for the given multi-volume cartridge retrieved from a second of the plurality of manifest files to determine which is most current, to the output file thereby restoring the virtual storage environment for the user from the plurality of manifest files.

2. The method of claim 1, further comprising the step of using the output file in a media import operation for a media library.

3. The method of claim 2, wherein the media library is a data storage library comprising a plurality of tape media devices for data storage and at least one tape drive.

4. The method of claim 1, wherein at least two of the manifest files are original manifest files, each of the original manifest files generated from a media export function.

5. The method of claim 4, wherein the certain of the retrieved virtual volume indicia which are copied to the output file comprise all the retrieved virtual volume indicia from the original manifest files.

6. The method of claim 1, wherein at least one of the manifest files is an original manifest file generated from a media export function, and at least one of the manifest files is a cumulative manifest file generated from a previous merge manifest file function.

7. The method of claim 1, wherein the certain of the retrieved multi-volume media indicia which are copied to the output file are determined by comparing a multi-volume media indicia for a given multi-volume cartridge retrieved from a first of the plurality of manifest files with a corresponding multi-volume media indicia for the given multi-volume cartridge retrieved from a second of the plurality of manifest files to determine which is most current.

8. The method of claim 1, wherein a virtual volume indicia for a given virtual volume retrieved from a first of the plurality of manifest files is copied to the output file if a corresponding virtual volume indicia for the given virtual volume does not exist on any other of the plurality of manifest files.

9. The method of claim 1, wherein a multi-volume media indicia for a given multi-volume cartridge retrieved from a first of the plurality of manifest files is copied to the output file if a corresponding multi-volume media indicia for the given multi-volume cartridge does not exist on any other of the plurality of manifest files.

10. The method of claim 1, wherein the multi-volume media indicia is with respect to a multi-volume media device having a plurality of virtual volumes stored thereon, and the associated virtual volume indicia is with respect to the plurality of virtual volumes.

11. A computer system for merging a plurality of manifest files that are the resultant output from different export operations, each having at least one multi-volume media indicia and associated virtual volume indicia, to restore a virtual storage environment for a user from the plurality of manifest files, the method comprising:

means for retrieving each of the associated virtual volume indicia from the plurality of manifest files and selectively copying certain of the retrieved virtual volume indicia, determined by comparing a virtual volume indicia for a given virtual volume retrieved from a first of the plurality of manifest files with a corresponding virtual volume indicia for the given virtual volume retrieved from a second of the plurality of manifest files to determine which is most current, to an output file; and means for retrieving each of the associated multi-volume media indicia from the plurality of manifest files and selectively copying certain of the retrieved multi-volume media indicia, determined by comparing a multi-volume media indicia for a given multi-volume cartridge retrieved from a first of the plurality of manifest files with a corresponding multi-volume media indicia for the given multi-volume cartridge retrieved from a second of the plurality of manifest files to determine which is most current, to the output file thereby restoring the virtual storage environment for the user from the plurality of manifest files.

12. The computer system of claim 11, wherein the media library is a data storage library comprising a plurality of tape media devices for data storage and at least one tape drive.

13. The computer system of claim 11, wherein at least two of the manifest files are original manifest files, each of the original manifest files generated from a media export function.

14. The computer system of claim 11, wherein at least one of the manifest files is an original manifest file generated from a media export function, and at least one of the manifest files is a cumulative manifest file generated from a previous merge manifest file function.

15. The computer system of claim 14, wherein the certain of the retrieved virtual volume indicia which are copied to the output file comprise all the retrieved virtual volume indicia from the original manifest files.

16. The computer system of claim 11, wherein at least one of the manifest files is an original manifest file generated from a media export function, and at least one of the manifest files is a cumulative manifest file generated from a previous merge manifest file function.

17. The computer system of claim 11, wherein the certain of the retrieved multi-volume media indicia which are copied to the output file are determined by comparing a multi-volume media indicia for a given multi-volume cartridge retrieved from a first of the plurality of manifest files with a corresponding multi-volume media indicia for the given multi-volume cartridge retrieved from a second of the plurality of manifest files to determine which is most current.

18. The computer system of claim 11, wherein a virtual volume indicia for a given virtual volume retrieved from a first of the plurality of manifest files is copied to the output file if a corresponding virtual volume indicia for the given virtual volume does not exist on any other of the plurality of manifest files.

19. The computer system of claim 11, wherein a multi-volume media indicia for a given multi-volume cartridge retrieved from a first of the plurality of manifest files is copied to the output file if a corresponding multi-volume media indicia for the given multi-volume cartridge does not exist on any other of the plurality of manifest files.

20. The computer system of claim 11, wherein the multi-volume media indicia is with respect to a multi-volume media device having a plurality of virtual volumes stored thereon, and the associated virtual volume indicia is with respect to the plurality of virtual volumes.

21. A computer program product on a computer readable storage medium executed by a computer system for merging a plurality of manifest files that are the resultant output from different export operations, each having at least one multi-volume media indicia and associated virtual volume indicia, to restore a virtual storage environment for a user from the plurality of manifest files, the computer program product comprising:

instruction means for retrieving each of the associated virtual volume indicia from the plurality of manifest files and selectively copying certain of the retrieved virtual volume indicia, determined by comparing a virtual volume indicia for a given virtual volume retrieved from a first of the plurality of manifest files with a corresponding virtual volume indicia for the given virtual volume retrieved from a second of the plurality of manifest files to determine which is most current, to an output file; and instruction means for retrieving each of the associated multi-volume media indicia from the plurality of manifest files and selectively copying certain of the retrieved multi-volume media indicia, determined by comparing a multi-volume media indicia for a given multi-volume cartridge retrieved from a first of the plurality of manifest files with a corresponding multi-volume media indicia for the given multi-volume cartridge retrieved from a second of the plurality of manifest files to determine which is most current, to the output file to thereby restore the virtual storage environment for the user from the plurality of manifest files.

* * * * *